United States Patent
Sylvain

(10) Patent No.: US 7,395,068 B2
(45) Date of Patent: Jul. 1, 2008

(54) CALLING NON-PSTN NUMBERS VIA A MOBILE TERMINAL

(75) Inventor: Dany Sylvain, Gatineau (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 5 days.

(21) Appl. No.: 11/190,278

(22) Filed: Jul. 26, 2005

(65) Prior Publication Data

US 2007/0025333 A1 Feb. 1, 2007

(51) Int. Cl.
*H04Q 7/20* (2006.01)
*H04M 3/42* (2006.01)

(52) U.S. Cl. .................. 455/445; 455/428; 455/417
(58) Field of Classification Search .............. 455/417, 455/414.1, 422.1, 428, 445
See application file for complete search history.

(56) References Cited

U.S. PATENT DOCUMENTS

| 6,819,945 | B1 | 11/2004 | Chow et al. |
| 6,882,862 | B1 | 4/2005 | Chia et al. |
| 6,999,770 | B2 * | 2/2006 | Hirsbrunner et al. ........ 455/445 |
| 2002/0024943 | A1 | 2/2002 | Karaul et al. |
| 2006/0121902 | A1 * | 6/2006 | Jagadeesan et al. ......... 455/439 |

OTHER PUBLICATIONS

International Search Report for PCT/IB2006/002015 mailed Jan. 24, 2007.

* cited by examiner

*Primary Examiner*—Barry W Taylor
(74) *Attorney, Agent, or Firm*—Withrow & Terranova, PLLC

(57) ABSTRACT

The present invention allows mobile terminals to initiate calls to either PSTN or non-PSTN addresses through a cellular interface. In operation, the mobile terminal will determine a terminating address to which a call is to be initiated based on user input or selection. The mobile terminal will then determine whether the terminating address should be used to directly initiate a call through the cellular interface. When the terminating address should be used to directly initiate the call, the mobile terminal will directly initiate the call using the terminating address. When the terminating address should not be used to directly initiate the call, the mobile terminal will send the terminating address to a service node. The service node will then initiate an indirect call process using the terminating address to establish the call between an endpoint associated with the terminating address and the cellular interface of the mobile terminal.

20 Claims, 7 Drawing Sheets

CALLING NON-PSTN NUMBERS VIA A MOBILE TERMINAL

FIELD OF THE INVENTION

The present invention relates to communications, and in particular to calling non-PSTN (Public Switched Telephone Network) numbers via a mobile terminal, such as a cellular telephone or appropriately equipped personal digital assistant (PDA).

BACKGROUND OF THE INVENTION

Many businesses have enterprise telephone networks, wherein each terminal is associated with a private directory number and sometimes a public directory number. The private directory numbers can be used to call from terminal to terminal within the enterprise telephone network, even when the respective terminals are in different corporate locations. Accordingly, the need to dial area codes or other prefixes is avoided. For callers outside of the enterprise telephone network, the caller must use the public directory numbers associated with the terminals or a common enterprise number and an extension number. Use of the private directory numbers by those outside of the enterprise is generally futile, as the Public Switched Telephone Network (PSTN) will not recognize the private directory numbers.

Given the proliferation of cellular communication, many employees rely on their cellular telephones to communicate with other employees. In many instances, these employees need to use their cellular telephones to call terminals within the enterprise telephone network. When doing so, the public directory numbers associated with the enterprise terminals must be used. These public directory numbers may need to be dialed with an appropriate area code in certain cases. As such, the employees who use cellular telephones often need to keep track of and use different public and private directory numbers depending on whether they are in the office or traveling. As the number of contacts increases, keeping track of multiple numbers for a single person or terminal becomes difficult to manage.

Cellular telephone users are also unable to initiate calls to many voice over packet (VoP) terminals having Internet Protocol (IP), Session Initiation Protocol (SIP), or other packet network addresses, whether they are associated with a private enterprise telephone network or not. Accordingly, there is a need for a way to initiate calls from cellular terminals using private directory numbers. There is a further need to initiate calls to packet network addresses using a cellular terminal from a traditional cellular interface.

SUMMARY OF THE INVENTION

The present invention allows mobile terminals to initiate calls to either PSTN or non-PSTN addresses through a cellular interface. Example non-PSTN addresses include packet network addresses, such as Internet Protocol addresses and Session Initiation Protocol addresses, as well as H.323 addresses and private addresses associated with a private enterprise network. An address includes any type of communication address, including directory numbers. In operation, the mobile terminal will determine a terminating address to which a call is to be initiated based on user input or selection. The mobile terminal will then determine whether the terminating address should be used to directly initiate a call through its cellular interface. When the terminating address should be used to directly initiate the call, the mobile terminal will directly initiate the call using the terminating address.

When the terminating address should not be used to directly initiate the call, the mobile terminal will send the terminating address to a service node, perhaps through an alternate signaling network. The alternate signaling network may be a cellular packet network, whereas the call will ultimately be established through the network supporting cellular voice communications. The service node will then initiate an indirect call process using the terminating address to establish the call between an endpoint associated with the terminating address and the cellular interface of the mobile terminal. In particular, the service node will establish a first link between an interface node, such as a trunk gateway, and the mobile terminal, as well as a second link between the interface node and the endpoint associated with the terminating address. The first and second links will form all or part of the bearer path for the call between the mobile terminal and the endpoint.

The first link may be established using different techniques. The first technique involves the service node initiating a setup call to create the first link. The mobile terminal will answer the setup call and the first link will be established between the interface node and the mobile terminal. In a second embodiment, the mobile terminal will initiate the setup call to the service node via the interface node. The service node will effectively answer the call such that the first link is established between the interface node and the cellular interface of the mobile terminal. The address for the service node may be known to the mobile terminal or may be provided by the service node, again, perhaps through the alternate signaling network.

The decision to initiate a direct calling process or the indirect calling process involving the service node may be based on whether the mobile terminal is operating in a local wireless or cellular mode, user preferences, or an ability to actually initiate a direct call process. In one embodiment, only public directory numbers may be dialed directly from the cellular interface of the mobile terminal, wherein local wireless communications may support any type of address, including public directory numbers. The service node will have its own permanent or temporary public directory number.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
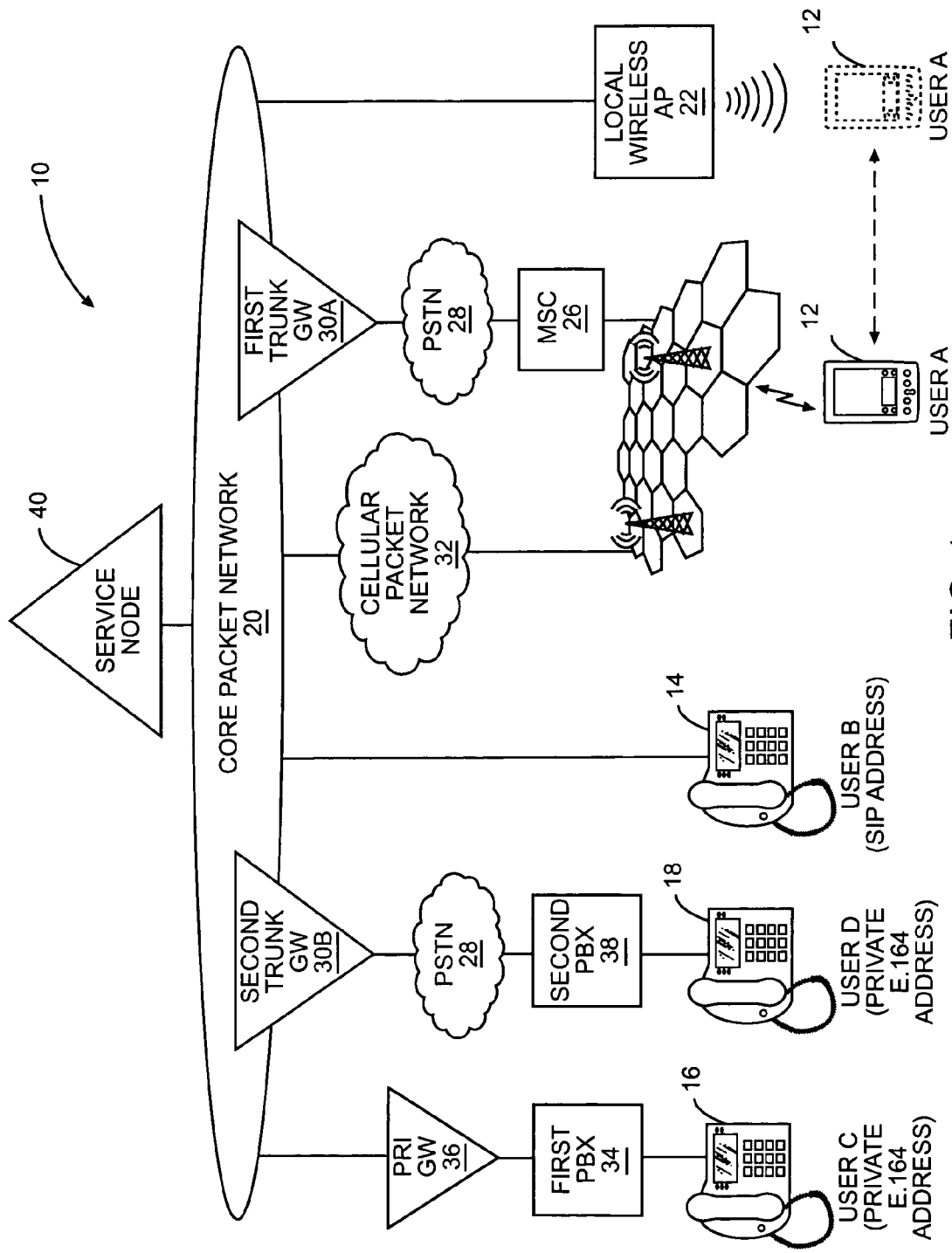
FIG. 1 is a block representation of a communication environment according to one embodiment of the present invention.

Prior to delving into the details of the present invention, an overview of an exemplary communication environment 10 is provided in association with FIG. 1. As illustrated, a mobile terminal 12, which is associated with User A, is provided and is capable of establishing communications with other terminals, such as a voice-over-packet (VoP) terminal 14 that is associated with User B; a first enterprise terminal 16 that is associated with User C and part of a first private enterprise network; and a second enterprise terminal 18 that is associated with User D and part of a second private enterprise network. Assume that User B has a packet network address, such as an Internet Protocol (IP) or Session Initiation Protocol (SIP) address; User C has a first private directory number (Private E.164 Address); and User D has a second private directory number (Private E.164 Address). The first and second private directory numbers, as well as the SIP address, are exemplary non-PSTN (Public Switched Telephone Network) numbers, which cannot be reached directly through a cellular interface of the mobile terminal 12. The non-PSTN numbers may also include certain H.323 addresses. The mobile terminal 12, through its cellular interface, is able to directly initiate calls to PSTN directory numbers, but will rely on one of the inventive aspects of the present invention to initiate an indirect call initiation process when calls to non-PSTN numbers are desired. Calls from the mobile terminal 12 to the VoP terminal 14, first enterprise terminal 16, or second enterprise terminal 18 may be supported, at least in part, by a core packet network 20.

In one embodiment, the mobile terminal 12 is a multimode terminal wherein both cellular and local wireless communications are supported. Cellular communications may be facilitated through a cellular interface using traditional cellular communication standards, such as code division multiple access (CDMA), time division multiple access (TDMA), orthogonal frequency division multiple access (OFDM), or any other known cellular communication access technology. Local wireless communications generally have a much smaller range than cellular communications, and will include wireless local area network (WLAN) technologies, such as those set forth in the IEEE 802.11 or Bluetooth standards. When operating in a multimode configuration, the mobile terminal 12 is considered to have a cellular interface as well as a local wireless interface, although each of the interfaces may be incorporated in the same electronics or share certain electronics, as will be discussed further below.

For local wireless communications, the mobile terminal 12 may gain access to the core packet network 20 through an appropriate local wireless access point (AP) 22, which may connect directly to the core packet network 20 or indirectly through an appropriate access network (not shown). The cellular interface may support data and voice communications, both of which are generally supported through separate access mediums, each of which may couple directly or indirectly to the core packet network 20. Basic cellular access is provided through a network of base stations 24. For voice, the network of base stations 24 is connected to a mobile switching center (MSC) 26, which may connect to the PSTN 28, which may connect to the core packet network 20 through an appropriate first trunk gateway (GW) 30A. The first trunk gateway 30A will provide the requisite traffic and signaling conversions to allow communications to be established over the core packet network 20 and the PSTN 28. For data, the network of base stations 24 is connected to a cellular packet network 32, which connects to the core packet network 20. Generally, the cellular packet network 32 is a relatively low-speed access medium, which may not support VoP sessions, although various non-voice-related applications and signaling may be supported. Depending on the relative proximity of the mobile terminal 12 to the network of base stations 24 or an appropriate access point, such as the local wireless access point 22, the mobile terminal 12 may operate in a local wireless mode, cellular mode, or both at any given time.

User B's VoP terminal 14 may connect directly or indirectly to the core packet network 20 and support VoP sessions. User C's first enterprise terminal 16 may connect to a first private branch exchange (PBX) 34, which forms at least a part of the first private enterprise network. The first PBX 34 may be associated with a Primary Rate Interface (PRI) gateway 36, which connects directly or indirectly to the core packet network 20, wherein VoP sessions are established up to the PRI gateway 36, which will provide the requisite interworking with the first PBX 34 to support the first enterprise terminal 16. User D's second enterprise terminal 18 may be associated with a second PBX 38 for the second enterprise network. The second PBX 38 may be connected directly to the PSTN 28, which may connect to the core packet network 20 through any number of gateways, such as through a second trunk gateway 30B.

For the present invention, the mobile terminal 12 will cooperate with a signaling entity, generically referred to as a service node 40, to initiate calls to non-PSTN addresses. In general, User A will interact with the mobile terminal 12 to enter or select a terminating address, which is an address associated with a destination to which a call is to be initiated. The address may either be a PSTN address or a non-PSTN address, such as a private enterprise directory number or a packet network address. The mobile terminal 12 will analyze the terminating address to determine whether the call can be initiated directly, based on whether the terminating address is a PSTN address or a non-PSTN address. Calls to a PSTN address can be initiated directly in traditional fashion through the cellular network. For calls intended for a non-PSTN address, the mobile terminal 12 will provide the service node 40 with the terminating address and perhaps the PSTN address associated with the mobile terminal 12 itself. The terminating address may be sent to the service node 40 from the mobile terminal 12 through a lower speed data connection via the cellular packet network 32. The service node 40 may provide any address translations to the terminating address to allow a connection to be established with the endpoint associated with the terminating address. The service node 40 and mobile terminal 12 will then cooperate to establish a call between the cellular interface of the mobile terminal 12 and the endpoint associated with the terminating address.

Different techniques may be employed in establishing the call. In general, two links are used to support the call between the endpoint associated with the terminating address and the cellular interface of the mobile terminal 12. A first link is established between an interface point, such as the first trunk gateway 30A, and the cellular interface of the mobile terminal 12, and a second link is established between the endpoint associated with the terminating address and the interface point. The first link can be initiated from the service node 40 or the mobile terminal 12. When initiated from the service node 40, the service node 40 will effectively interact with the interface point, which will place a call to the cellular interface of the mobile terminal 12. The cellular interface of the mobile terminal 12 will answer and a link is established with the interface point. Thus, the service node 40 will effectively call the mobile terminal 12 back in response to receiving the terminating address from the mobile terminal 12. The service node 40 can establish the second link for the call by initiating a call to the endpoint associated with the terminating address.

When the mobile terminal 12 initiates the first link of the call, the mobile terminal 12 will initiate a call to the service node 40, wherein the call is effectively received on behalf of the service node 40 by the interface point, which will interact with the service node 40. The PSTN number used to initiate the call to the service node 40 may be previously known to the mobile terminal 12 or may be received from the service node 40 through the cellular packet network 32. Again, a link is established between the interface point and the cellular interface of the mobile terminal 12, and the service node 40 can establish the second link between the interface point and the endpoint associated with the terminating address.

Figure 2:
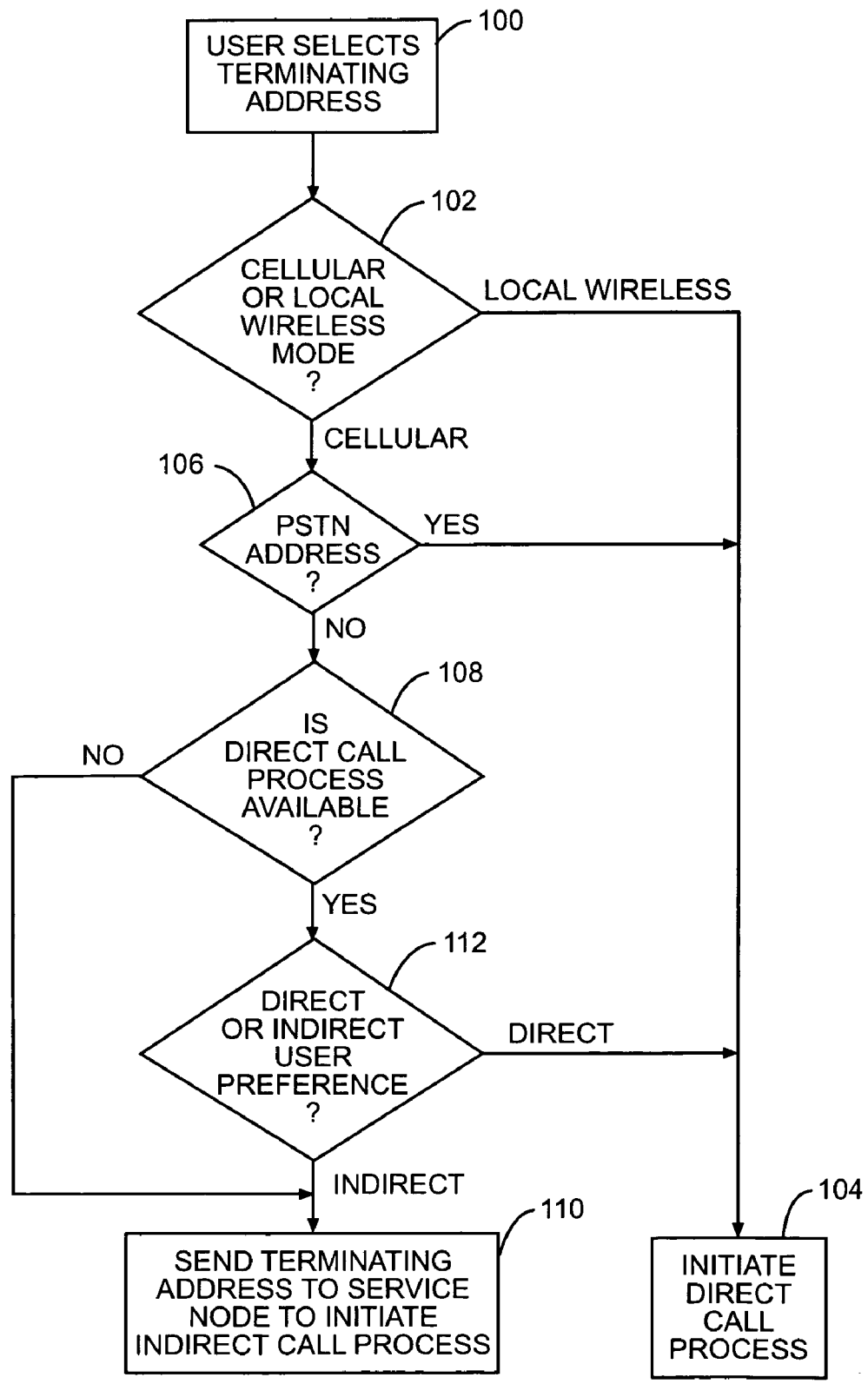
FIG. 2 is a flow diagram illustrating the operation of an exemplary embodiment of the present invention.

Referring now to FIG. 2, an exemplary operation of a mobile terminal 12 is provided according to one embodiment of the present invention. Again, this is merely an example of how the mobile terminal 12 may operate. Assume that the mobile terminal 12 can operate in cellular or local wireless modes, that the mobile terminal 12 will generally only operate in either cellular mode or local wireless mode at any given time, and that PSTN or non-PSTN addresses may be initiated directly when in local wireless mode through known techniques. Initially, the user will select or enter a terminating address associated with an endpoint to which a call is desired (step 100). The mobile terminal 12 will determine whether it is in cellular or local wireless mode (step 102). If in local wireless mode, the mobile terminal 12 will initiate a direct call process (step 104), which will result in the mobile terminal 12 directly initiating a call to the terminating address. An indirect call process, which involves the service node 40, will not be employed.

If the mobile terminal 12 is operating in cellular mode (step 102), the mobile terminal 12 will determine whether the terminating address is a PSTN address (step 106). If the terminating address is a PSTN address, the mobile terminal 12 will initiate the direct call process via the cellular interface by simply dialing the terminating address to initiate the call (step 104). If the terminating address is not a PSTN address (step 106), the mobile terminal 12 can determine whether the direct call process is still available (step 108). If the direct call process is not available, the mobile terminal 12 will send the terminating address to the service node 40 through the cellular packet network 32 to initiate the indirect call process involving the service node 40 as describe above (step 110). If the direct call process is still available (step 108), the mobile terminal 12 may analyze any use preferences to determine whether to initiate the call using the direct call process or the indirect call process employing the service node 40 (step 112). Preferences may be based on they physical location of the calling or called parties, their respective access networks, terminal capabilities, time, date, or the like. Further, the users may establish certain defaults when a choice is available. Based on the preferences, either the direct call process (step 104) or indirect call process (step 110) is selected.

Figure 3:
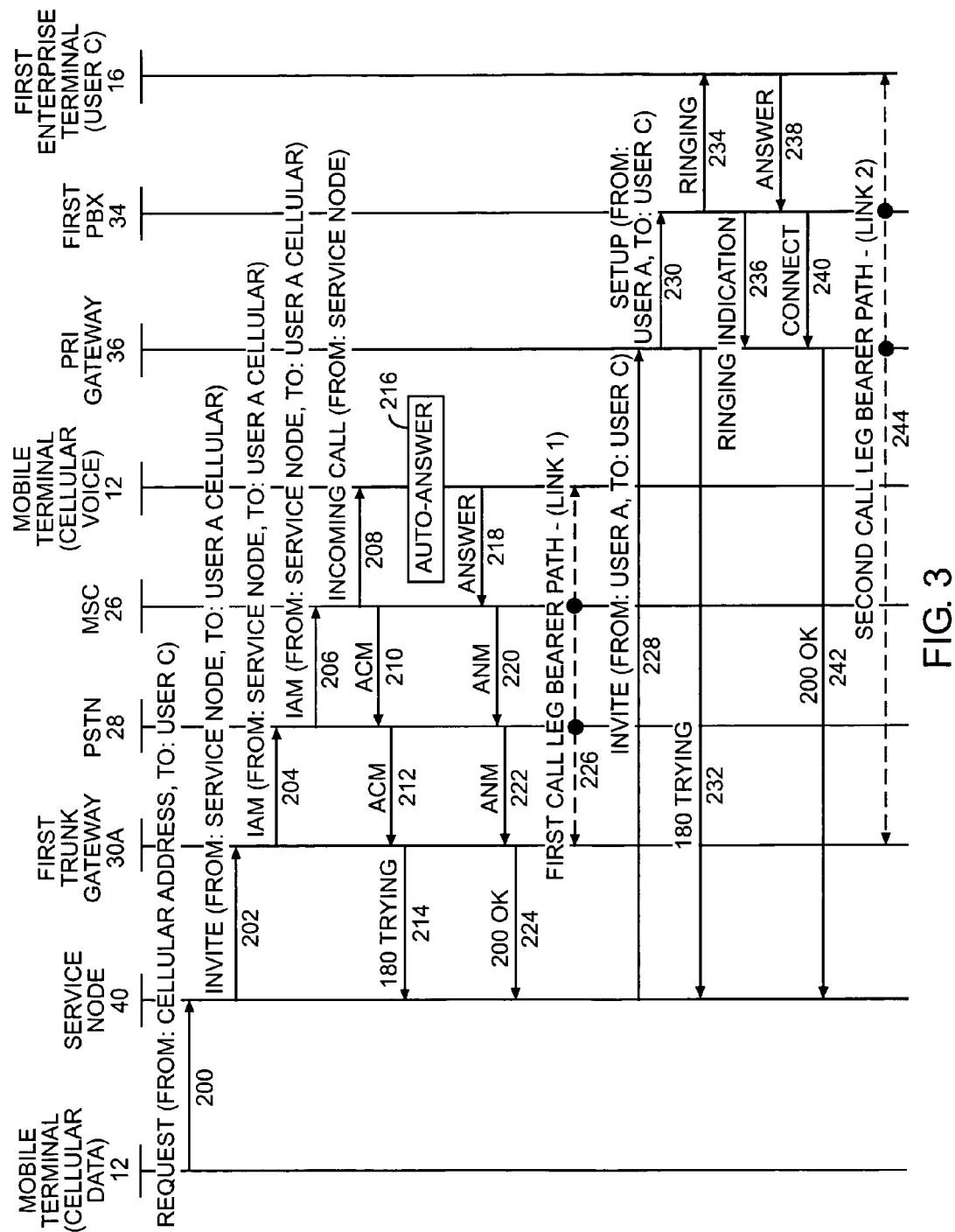
FIG. 3 is a communication flow diagram wherein a call to a private enterprise directory number is initiated according to one embodiment of the present invention.
Figure 4:
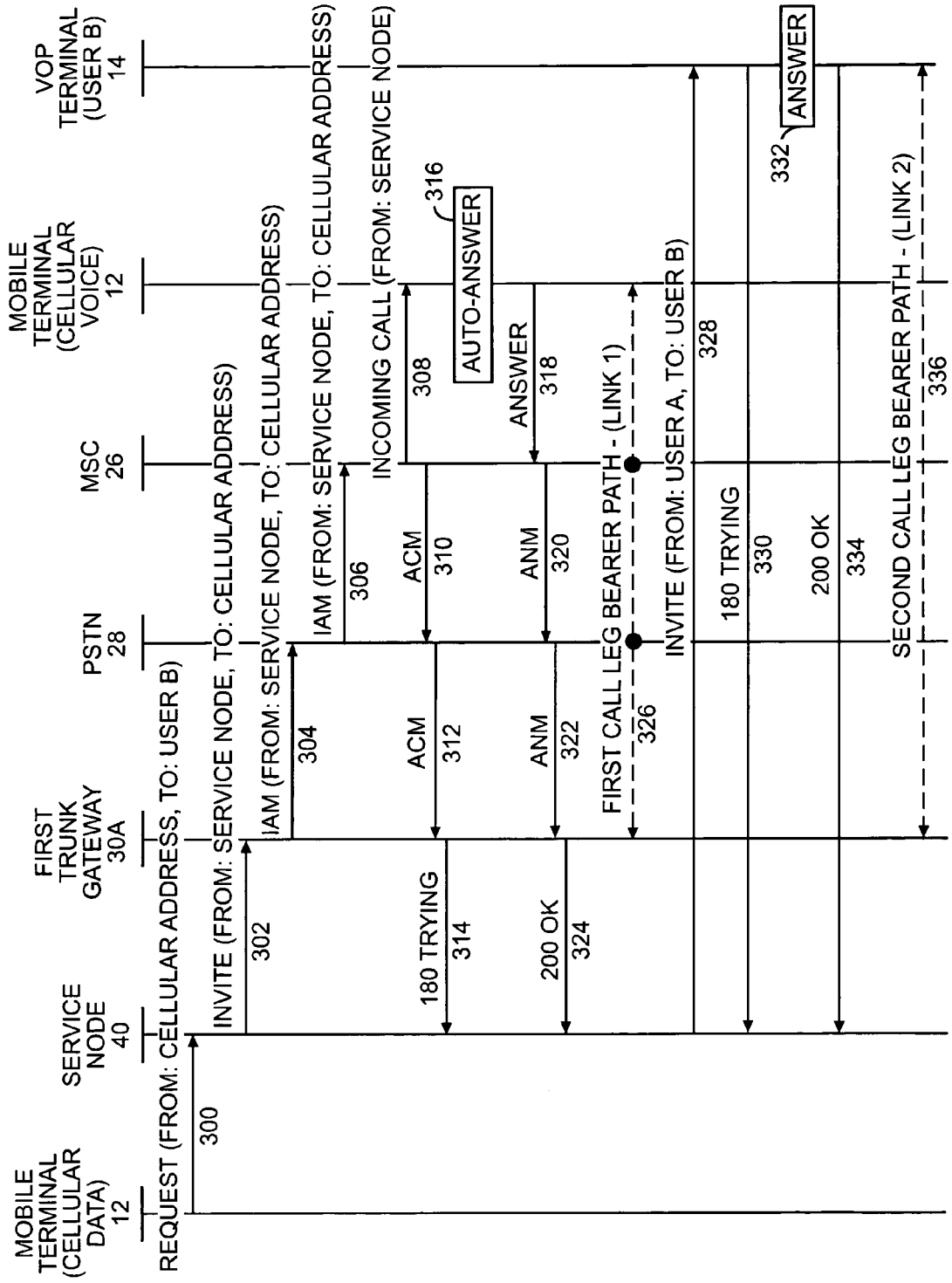
FIG. 4 is a communication flow diagram wherein a call to a packet network address is initiated according to one embodiment of the present invention.
Figure 5:
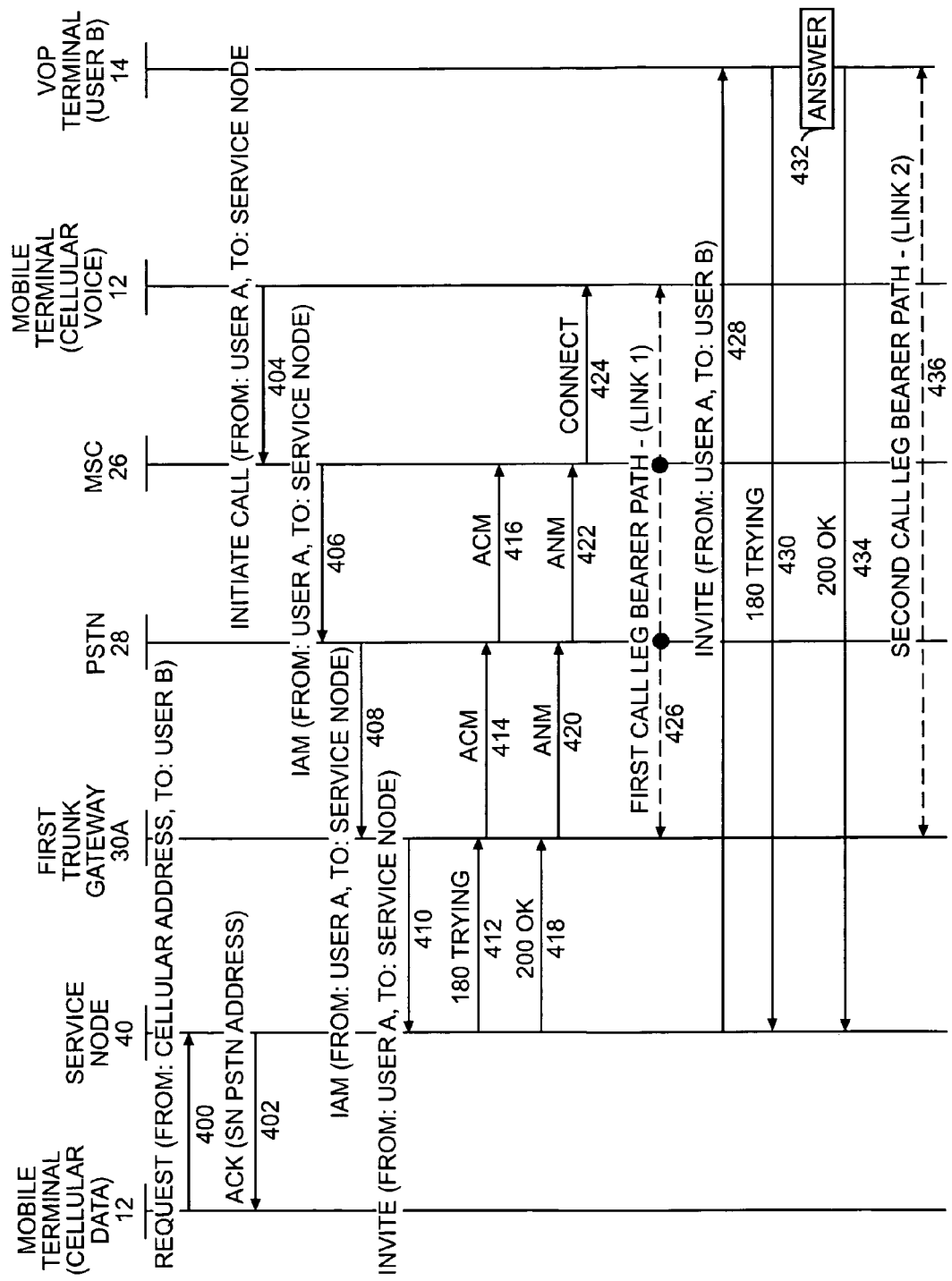
FIG. 5 is an alternative communication flow diagram wherein a call to a packet network address is initiated according to one embodiment of the present invention.

With reference to FIGS. 3, 4, and 5, three detailed scenarios are provided for when the indirect call process is selected. With particular reference to FIG. 3, the mobile terminal 12 will initiate a call to the private directory number (Private E.164 Address) associated with the first enterprise terminal 16 of User C. In this example, the service node 40 will initiate a call back to the mobile terminal 12 in order to initiate the first link between the first trunk gateway 30A and the mobile terminal 12. Initially, assume the private directory number for User C is selected or entered by User A, and the mobile terminal 12 sends a Request through the cellular packet network 32 to the service node 40 to initiate the indirect call process (step 200). The Request identifies that the call is to User C's private directory number and is from the cellular interface of the mobile terminal 12. The service node 40 will then initiate a call to the cellular interface of the mobile terminal 12 via the first trunk gateway 30A by sending a SIP Invite message directed to User A's cellular address (PSTN directory number) (step 202). The SIP Invite message will be directed to the first trunk gateway 30A, which will generate an Initial Address Message (IAM) and initiate a call between the first trunk gateway 30A and the cellular interface of the mobile terminal 12 (step 204). The IAM may identify the service node 40 as the originating party and include User A's cellular address. The IAM is routed through the PSTN 28 to the appropriate MSC 26 (step 206), which will send an Incoming Call message to the cellular interface of the mobile terminal 12 identifying the originator as the service node 40 (step 208).

Meanwhile, the MSC 26 will send an Address Complete Message (ACM) back through the PSTN 28 to the first trunk gateway 30A (steps 210 and 212). Upon receipt of the ACM, the first trunk gateway 30A will respond to the SIP Invite message by sending a 180 Trying message back to the service node 40 to indicate that the call is being presented to the mobile terminal 12 (step 214). In this embodiment, the mobile terminal 12 is configured to automatically answer incoming calls from the service node 40, especially those received from the service node 40 after the mobile terminal 12 has sent a request to the service node 40. The mobile terminal 12 will answer the call (step 216) and send an appropriate message to the MSC 26 (step 218), which will send an Answer Message (ANM) to the first trunk gateway 30A through the PSTN 28 (steps 220 and 222). The first trunk gateway 30A will send a 200 OK message to the service node 40 to indicate that the mobile terminal 12 answered the call (step 224). At this point, a first call leg bearer path (Link 1) is established between the first trunk gateway 30A and the cellular interface of the mobile terminal 12 via the PSTN 28 and the MSC 26 (step 226).

Meanwhile, or after link 1 is established, the service node 40 will initiate a second call leg bearer path (Link 2) between the first trunk gateway 30A and the first enterprise terminal 16 of User C. To do so, the service node 40 will send a SIP Invite message to the PRI gateway 36, which is associated with the first enterprise terminal 16 (step 228). The SIP Invite message will include the SDP (session description protocol) information for the first trunk gateway. It will also indicate that the call is from User A and is intended for User C. The PRI gateway 36 will respond to the SIP Invite message by sending a Setup message to the first PBX 34 (step 230) and respond to the SIP Invite message by sending a 180 Trying message to the service node 40 (step 232). The first PBX 34 will initiate ringing of the first enterprise terminal 16 (step 234) as well as provide a ringing indication back to the PRI gateway 36 (step 236). When the first enterprise terminal 16 is answered, an Answer indication is provided to the first PBX 34 (step 338), which will send a Connect message to the PRI gateway 36 (step 240). The PRI gateway 36 will send a 200 OK message back to the service node 40 (step 242). The above signaling will be sufficient to establish a second call leg bearer path (Link 2) between the first trunk gateway 30A and the first enterprise terminal 16 (step 244). The first trunk gateway 30A will effectively connect or otherwise bridge the first and second call leg bearer paths (Link 1 and Link 2) to establish a call between the cellular interface of the mobile terminal 12 and the first enterprise terminal 16.

The service node 40 may translate the private directory number into a corresponding public directory number using internal or external translation tables or databases. This may be used for example to reach User D, as calls to user D need to transit via the PSTN 28. Alternatively, the service node 40 may translate the private directory number to a common enterprise public number plus an extension. In this case, the service node 40 would first set up a call to the common enterprise number and dial the extension number for User D, using for example in-band dual-tone multi-frequency (DTMF) digits inserted by the second trunk gateway 30B.

With particular reference to FIG. 4, assume User A selected a packet network address associated with the VoP terminal 14 of User B. An exemplary communication flow follows. Initially, assume the packet network address (SIP address) for User B is selected or entered by User A, and the mobile terminal 12 sends a Request through the cellular packet network 32 to the service node 40 to initiate the indirect call process (step 300). The Request identifies that the call is to User B's packet network address (SIP address) and is from the cellular interface of the mobile terminal 12. The service node 40 will then initiate a call to the cellular interface of the mobile terminal 12 via the first trunk gateway 30A by sending a SIP Invite message directed to User A's cellular address (PSTN directory number) (step 302). The SIP Invite message will be directed to the first trunk gateway 30A, which will generate an IAM and initiate a call between the first trunk gateway 30A and the cellular interface of the mobile terminal 12 (step 304). The IAM may identify the service node 40 as the originating party and include User A's cellular address. The IAM is routed through the PSTN 28 to the appropriate MSC 26 (step 306), which will send an Incoming Call message to the cellular interface of the mobile terminal 12 identifying the originator as the service node 40 (step 308).

Meanwhile, the MSC 26 will send an ACM back through the PSTN 28 to the first trunk gateway 30A (steps 310 and 312). Upon receipt of the ACM, the first trunk gateway 30A will respond to the SIP Invite message by sending a 180 Trying message back to the service node 40 to indicate that the call is being presented to the mobile terminal 12 (step 314). Again, the mobile terminal 12 is configured to automatically answer incoming calls from the service node 40, especially after the mobile terminal 12 has sent a request to the service node 40. The mobile terminal 12 will answer the call (step 316) and send an appropriate message to the MSC 26 (step 318), which will send an ANM to the first trunk gateway 30A through the PSTN 28 (steps 320 and 322). The first trunk gateway 30A will send a 200 OK message to the service node 40 to indicate that the mobile terminal 12 answered the call (step 324). At this point, a first call leg bearer path (Link 1) is established between the first trunk gateway 30A and the cellular interface of the mobile terminal 12 via the PSTN 28 and the MSC 26 (step 326).

Meanwhile, or after link 1 is established, the service node 40 will send an Invite message to the VoP terminal 14 of User B to initiate a second call leg bearer path (Link 2) between the first trunk gateway 30A and the VoP terminal 14 (step 328). The VoP terminal 14 will respond with a 180 Trying message (step 330) and await an answer. When answered (step 332), the VoP terminal 14 will send a 200 OK message back to the service node 40 (step 334). The above messaging will include sufficient information to allow the VoP terminal 14 to establish the second call leg bearer path (Link 2) with the first trunk gateway 30A (step 336), which will provide the requisite interworking between the first and second call leg bearer paths (Link 1 and Link 2) to facilitate a call between the cellular interface of the mobile terminal 12 and the VoP terminal 14.

With reference to FIG. 5, assume the mobile terminal 12 again has selected the packet network address associated with the VoP terminal 14 of User B to which a call should be initiated. Unlike the communication flow of FIG. 4, the communication flow illustrated in FIG. 5 uses the mobile terminal 12 to initiate the first call leg bearer path (Link 1) between the first trunk gateway 30A and the mobile terminal 12. Again, a Request is sent from the mobile terminal 12 to the service node 40 indicating that the mobile terminal 12 desires to make a call from its cellular interface to the packet network address of User B (step 400). Depending on whether or not the PSTN number associated with the service node 40 is already known to the mobile terminal 12, the service node 40 may send an Acknowledgement (ACK) containing a service node (SN) PSTN address back to the mobile terminal 12 (step 402). The Request and Acknowledgement may take place via the cellular packet network 32.

The mobile terminal 12 will then initiate a call to the service node 40 using the SN PSTN address (step 404). The serving MSC 26 will then send an IAM toward the first trunk gateway 30A via the PSTN 28 (steps 406 and 408). Upon receipt of the IAM, the first trunk gateway 30A will send a SIP Invite message to the service node 40 (step 410), which will respond with a 180 Trying message (step 412). The first trunk gateway 30A will continue by sending an ACM toward the MSC 26 through the PSTN 28 (steps 414 and 416). The service node 40 will then simulate answering the call by sending a 200 OK message to the first trunk gateway 30A (step 418). The first trunk gateway 30A will send an ANM toward the MSC 26 via the PSTN 28 to indicate that the call was answered (steps 420 and 422). The MSC 26 will then send a Connect message to the mobile terminal 12 (step 424) to effectively establish the first call leg bearer path (Link 1) between the first trunk gateway 30A and the cellular interface of the mobile terminal 12 (step 426).

Meanwhile, or after link 1 is established, the service node 40 will establish the second call leg bearer path (Link 2) between the first trunk gateway 30A and the cellular interface of the mobile terminal 12. To do so, the service node 40 will send a SIP Invite message to the VoP terminal 14 (step 428), which will respond with a 180 Trying message (step 430). When the VoP terminal 14 is answered (step 432), the VoP terminal 14 will send a 200 OK message back to the service node 40 (step 434), wherein a second call leg bearer path (Link 2) is established between the first trunk gateway 30A and the VoP terminal 14 (step 436). Again, the first trunk gateway 30A will effectively connect the first and second call leg bearer paths (Link 1 and Link 2) to facilitate a call between the cellular interface of the mobile terminal 12 and the VoP terminal 14.

Figure 6:
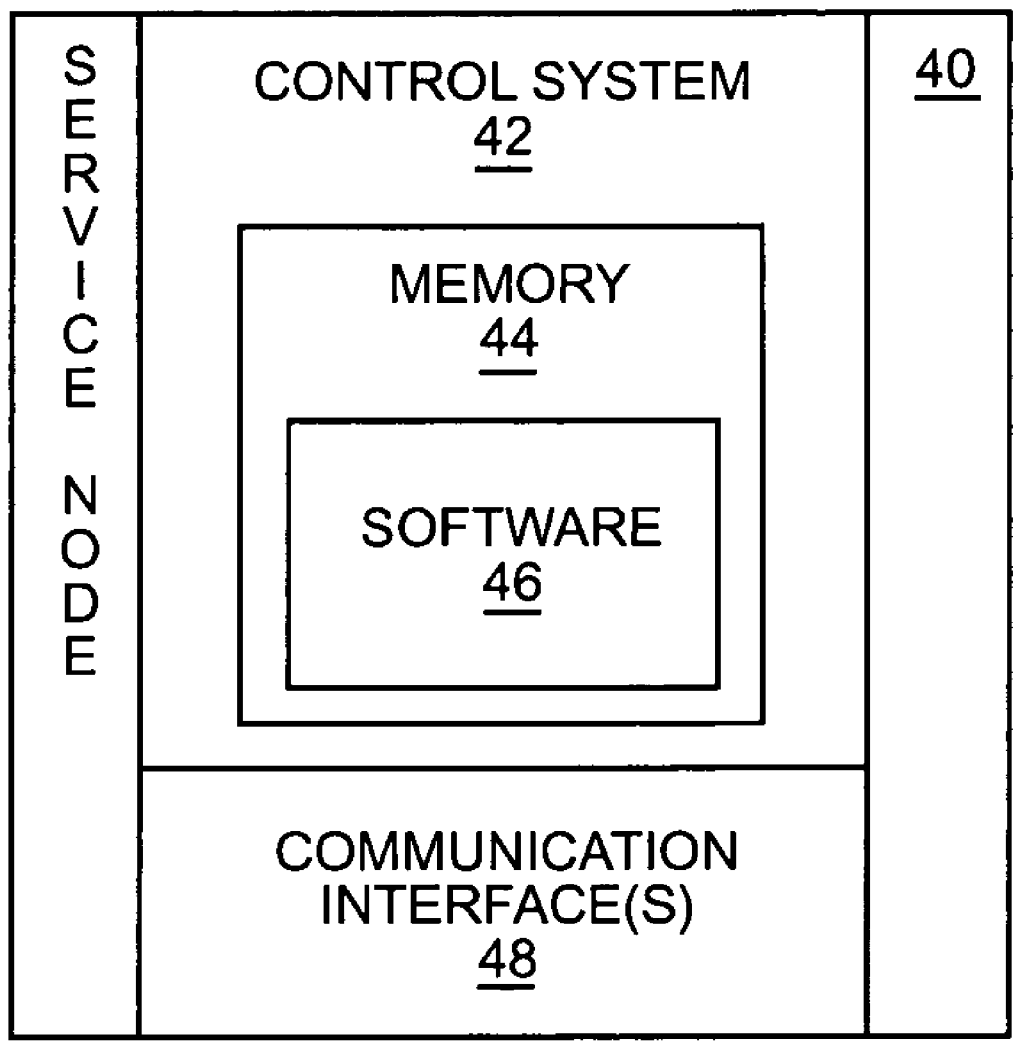
FIG. 6 is a block representation of a service node according to one embodiment of the present invention.

With reference to FIG. 6, a block representation of a service node 40 is provided. The service node 40 may include a control system 42 having sufficient memory 44 for the requisite software 46 to operate as described above. The control system 42 may include one or more communication interfaces 48 to facilitate communications with the various entities associated with the core packet network 20, and directly or indirectly with other entities illustrated in FIG. 1.

Figure 7:
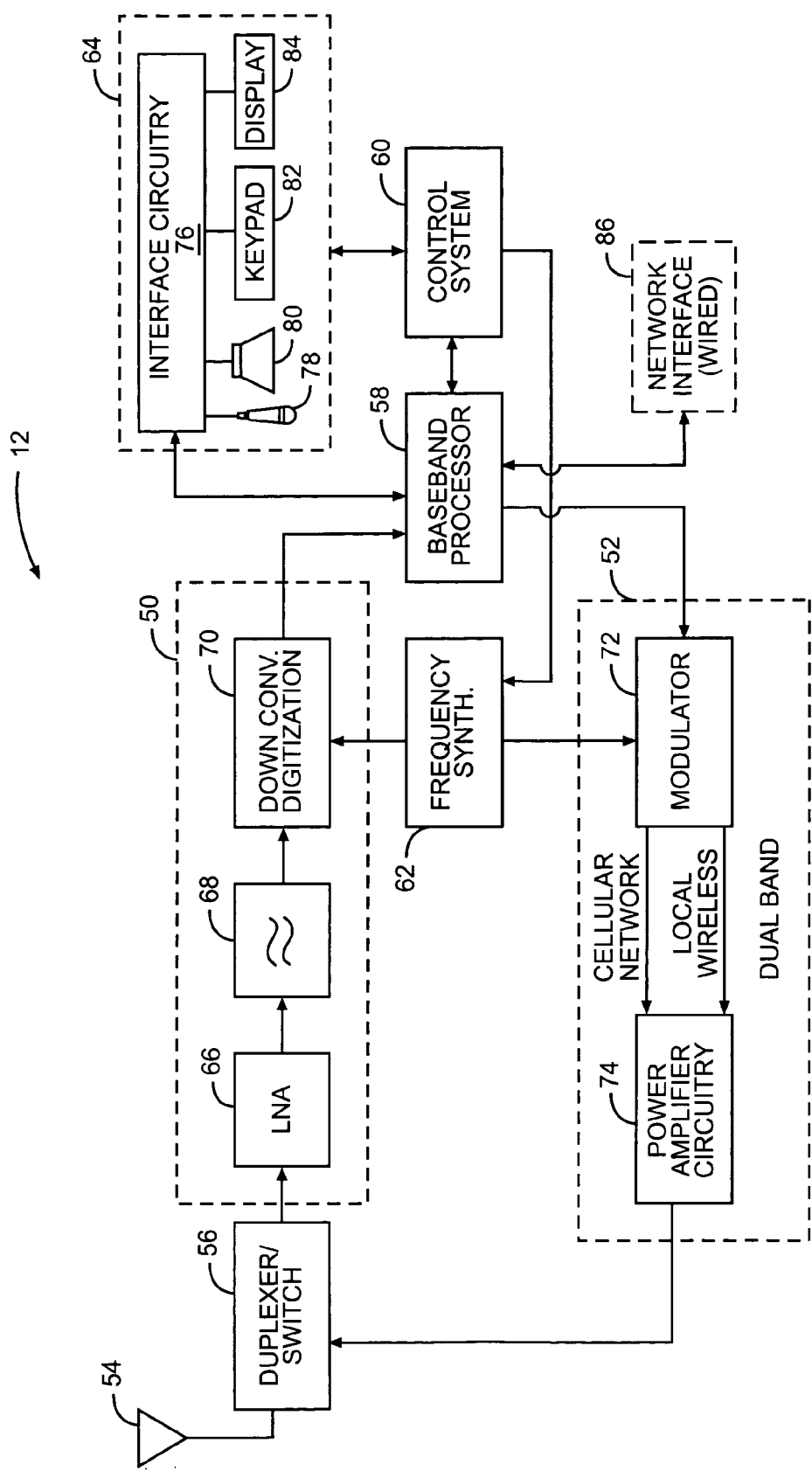
FIG. 7 is a block representation of a mobile terminal according to one embodiment of the present invention.

The basic architecture of a terminal 12 is represented in FIG. 7. The illustrated terminal 12 is a mobile terminal capable of local wireless and cellular operation. Those skilled in the art will recognize that the concepts of the present invention are applicable to wired or wireless terminals, wherein the terminals need support only one mode of communications. The terminal 12 may include a receiver front end 50, a radio frequency transmitter section 52, an antenna 54, a duplexer or switch 56, a baseband processor 58, a control system 60, a frequency synthesizer 62, and a user (originating party) interface 64. The receiver front end 50 receives information bearing radio frequency signals from one or more remote transmitters provided by a base station. A low noise amplifier 66 amplifies the signal. A filter circuit 68 minimizes broadband interference in the received signal, while downconversion and digitization circuitry 70 downconverts the filtered, received signal to an intermediate or baseband frequency signal, which is then digitized into one or more digital streams. The receiver front end 50 typically uses one or more mixing frequencies generated by the frequency synthesizer 62. The baseband processor 58 processes the digitized received signal to extract the information or data bits conveyed in the received signal. This processing typically comprises demodulation, decoding, and error correction operations. As such, the baseband processor 58 is generally implemented in one or more digital signal processors (DSPs).

On the transmit side, the baseband processor 58 receives digitized data, which may represent voice, data, or control information, from the control system 60, which it encodes for transmission. The encoded data is output to the transmitter 52, where it is used by a modulator 72 to modulate a carrier signal that is at a desired transmit frequency. Power amplifier circuitry 74 amplifies the modulated carrier signal to a level appropriate for transmission, and delivers the amplified and modulated carrier signal to the antenna 54 through the duplexer or switch 56. The control system 60 will operate to provide the functions described above that embody the concepts of the invention. The control system 60 may be integrated or distributed among different processing circuitry.

As noted above, the terminal 12 may be able to communicate wirelessly with the access point 22 as well as with the cellular network of base stations 24. Accordingly, the receiver front end 50, baseband processor 58, and radio frequency transmitter section 52 cooperate to provide either a wireless interface for the cellular network or the local wireless interface for the access point 22. These functions may be implemented using redundant circuitry, or by configuring common circuitry to operate in different modes. The configuration of the terminal 12 will be dictated by economics and designer choice.

A user may interact with the terminal 12 via the interface 64, which may include interface circuitry 76 associated with a microphone 78, a speaker 80, a keypad 82, and a display 84. The interface circuitry 76 typically includes analog-to-digital converters, digital-to-analog converters, amplifiers, and the like. Additionally, it may include a voice encoder/decoder, in which case it may communicate directly with the baseband processor 58. The microphone 78 will typically convert audio input, such as the user's voice, into an electrical signal, which is then digitized and passed directly or indirectly to the baseband processor 58. Audio information encoded in the received signal is recovered by the baseband processor 58, and converted by the interface circuitry 76 into an analog signal suitable for driving the speaker 80. The keypad 82 and display 84 enable the user to interact with the terminal 12, initiate communication sessions, input numbers to be dialed, access and select addresses or dialing plans, select from a number of available networks to use for communications, as well as provide traditional control of the terminal 12.

In addition to or in lieu of the local wireless and cellular interfaces, the terminal 12 may have other communication interfaces, such as a wired network interface 86, to facilitate communications using various communication technologies directly or via the local wireless access point 22. Those skilled in the art will recognize the numerous types of communication interfaces available for the present invention. For additional information, please see U.S. application Ser. No. 10/409,280 filed Apr. 8, 2003 entitled INTEGRATED WIRELINE AND WIRELESS SERVICE, U.S. application Ser. No. 10/409,290 filed Apr. 8, 2003 entitled CALL TRANSFER FOR AN INTEGRATED WIRELINE AND WIRELESS SERVICE, U.S. application Ser. No. 10/693,540 filed Oct. 24, 2003 entitled CALL TRANSFER FOR AN INTEGRATED WIRELINE AND WIRELESS SERVICE USING A TEMPORARY DIRECTORY NUMBER, U.S. application Ser. No. 10/693,539 filed Oct. 24, 2003 entitled CALL TRANSFER FOR AN INTEGRATED WIRELINE AND WIRELESS SERVICE USING A TEMPORARY DIRECTORY NUMBER, and U.S. application Ser. No. 10/784,743 filed Feb. 23, 2004 entitled CALL TRANSFER FOR AN INTEGRATED WIRELINE AND WIRELESS SERVICE, the disclosures of which are incorporated herein by reference in their entireties.

Those skilled in the art will recognize improvements and modifications to the preferred embodiments of the present invention. All such improvements and modifications are considered within the scope of the concepts disclosed herein and the claims that follow.

What is claimed is:

1. A method of operating a mobile terminal comprising:
   determining a terminating address to which a call is to be initiated;
   determining whether the terminating address can be used by the mobile terminal to directly initiate the call;
   when the terminating address can be used by the mobile terminal to directly initiate the call, directly initiating the call using the terminating address; and
   when the terminating address cannot be used by the mobile terminal to directly initiate the call, sending the terminating address to a service node, which will facilitate an indirect call process using the terminating address to establish the call.

2. The method of claim 1 wherein the service node establishes a first link between an interface node and the mobile terminal and a second link between the interface node and an endpoint associated with the terminating address, such that the first and second links form at least part of a bearer path for the call between the mobile terminal and the endpoint.

3. The method of claim 2 wherein establishing the first link comprises receiving a setup call initiated by the service node at the interface node and answering the call to establish the first link between the interface node and the mobile terminal.

4. The method of claim 2 wherein establishing the first link comprises initiating a setup call to the service node via the interface node to establish the first link between the interface node and the mobile terminal.

5. The method of claim 4 further comprising receiving a service node address for the service node from the service node.

6. The method of claim 1 wherein the terminating address is sent to the service node via a first network communication path and the call is established via a second network communication path.

7. The method of claim 6 wherein the first network communication path is through a cellular packet network and the second network communication path is through a cellular voice network.

8. The method of claim 1 wherein when the terminating address is a PSTN address, using the terminating address to directly initiate a call, and when the terminating address is a non-PSTN (Public Switched Telephone Network) address, sending the terminating address to the service node to initiate the indirect call process.

9. The method of claim 8 wherein the non-PSTN address is one of a group consisting of private network addresses and packet based addresses.

10. The method of claim 1 wherein determining whether the terminating address can be used by the mobile terminal to directly initiate the call is based on whether the mobile terminal is operating in a cellular or local wireless mode.

11. A method comprising:
receiving a terminating address from a mobile terminal in response to the mobile terminal determining that the terminating address cannot be used by the mobile terminal to directly initiate a call;
establishing a first link between an interface node and the mobile terminal; and
establishing a second link based on the terminating address between the interface node and an endpoint associated with the terminating address, such that the first and second links form at least part of a bearer path for the call between the mobile terminal and the endpoint.

12. The method of claim 11 wherein establishing the first link further comprises initiating a setup call to the mobile terminal tough the interface node to establish the first link between the interface node and the mobile terminal.

13. The method of claim 11 wherein establishing the first link comprises receiving a setup call from the mobile terminal via the interface node to establish the first link between the interface node and the mobile terminal.

14. The method of claim 13 further comprising sending a service node address to the mobile terminal, which uses the service node address to initiate the setup call.

15. The method of claim 11 wherein the terminating address is received from the mobile terminal via a first network communication path and the call is established via a second network communication path.

16. The method of claim 15 wherein the first network communication pat is through a cellular packet network and the second network communication path is through a cellular voice network.

17. The method of claim 11 wherein the terminating address is a non-PSTN (Public Switched Telephone Network) address.

18. The method of claim 17 wherein the non-PSTN address is one of a group consisting of private network addresses and packet based addresses.

19. The method of claim 11 further comprising translating the terminating address to a format necessary for establishing the second link.

20. An apparatus terminal comprising:
at least one communication interface; and
a control system associated with the at least one communication interface and adapted to:
determine a terminating address to which a call is to be initiated;
determine whether the terminating address can be used to directly initiate the call;
when the terminating address can be used to directly initiate the call, directly initiate the call using the terminating address; and
when the terminating address cannot be used to directly initiate the call, send the terminating address to a service node, which will facilitate an indirect call process using the terminating address to establish the call.

* * * * *